C. M. BEACH.
DRAFT TONGUE COUPLING.
APPLICATION FILED DEC. 21, 1914.
1,156,342.
Patented Oct. 12, 1915.
2 SHEETS—SHEET 2.
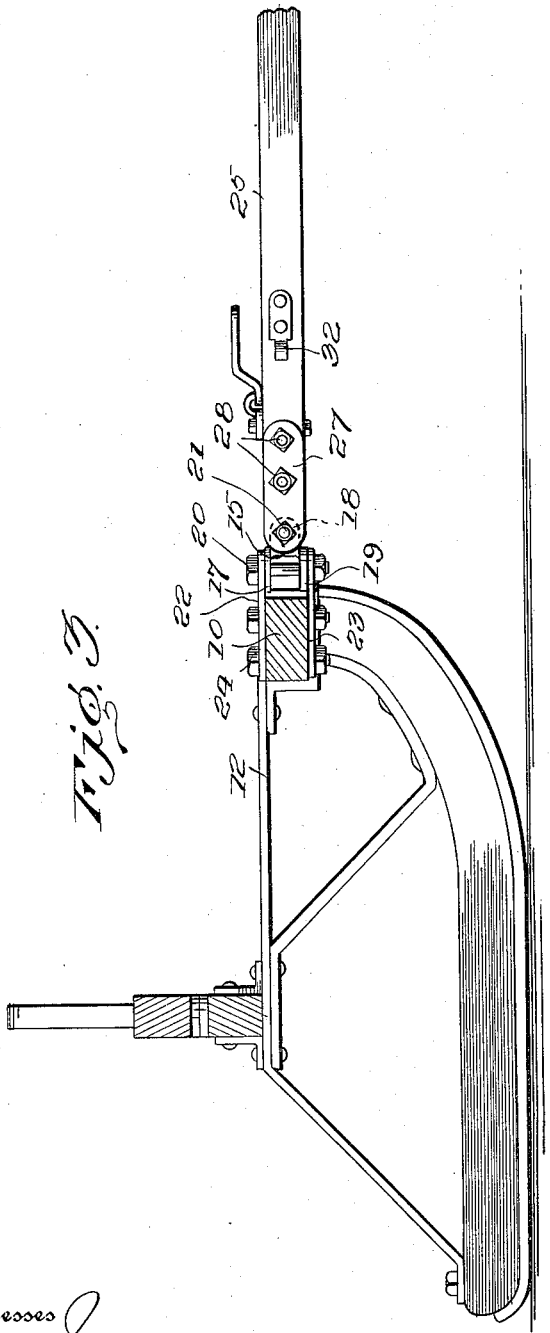
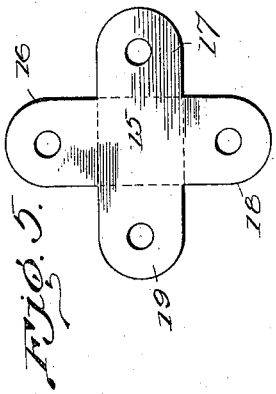
C. M. Beach, Inventor

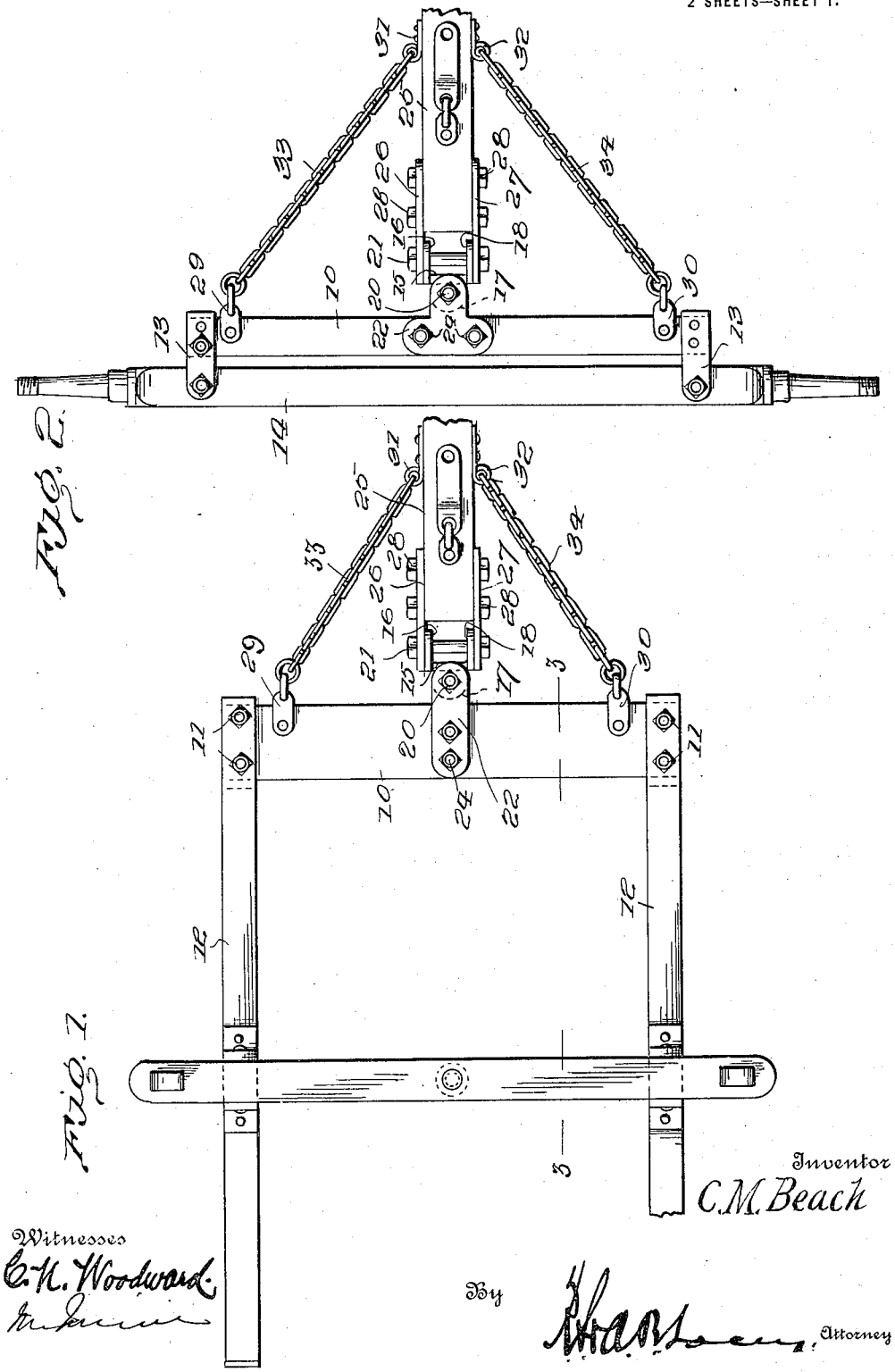

UNITED STATES PATENT OFFICE.

CHARLES M. BEACH, OF MARTEL, OHIO.

DRAFT-TONGUE COUPLING.

1,156,342.　　　　Specification of Letters Patent.　　Patented Oct. 12, 1915.

Application filed December 21, 1914.　Serial No. 878,319.

*To all whom it may concern:*

Be it known that I, CHARLES M. BEACH, a citizen of the United States, residing at Martel, in the county of Marion and State of Ohio, have invented certain new and useful Improvements in Draft-Tongue Couplings, of which the following is a specification.

This invention relates to improvements in the manner of coupling draft tongues to vehicles, whereby a rigid or a flexible tongue coupling may be readily and quickly produced, as required.

With these and other objects in view, the invention consists in certain novel features of construction as hereafter shown and described and then specifically pointed out in the claims.

The improved device may be applied to sleds of various makes or to wheeled vehicles, as may be preferred, but is designed more particularly for use in connection with the heavier forms of sleds employed for hauling heavy loads, and for the purpose of illustration, the improved device is shown applied to a conventional sled structure, and in the drawings thus employed:

Figure 1 is a plan view of the forward runners of a conventional sled with the improvement applied; Fig. 2 is a detail plan view with the improvement applied to the forward axle of a wheeled vehicle; Fig. 3 is a side elevation of the structure shown in Fig. 1 with the bolsters and the forward coupling member in section on the line 3—3 of Fig. 1; Fig. 4 is an enlarged detached perspective view of the main coupling member; Fig. 5 is a view of the blank from which the main coupling member is constructed.

Corresponding and like parts are referred to in the following description and indicated in all the views of the drawings by the same reference characters.

The improved device is applicable to various forms of sleds or other vehicles and includes a transverse member 10 rigidly connected to the vehicle, and when applied to a sled will be connected at its ends, as shown at 11, to the runners, represented conventionally at 12, and takes the place of the ordinary "roller" employed in vehicles of this class. When employed upon wheeled vehicles, the member 10 will be rigidly connected, as shown at 13, to the forward axle indicated at 14.

The improved device comprises a coupling member represented in detached form in Fig. 4 and is preferably constructed from a single sheet of plate metal, represented in blank in Fig. 5 and includes a main central portion 15 and terminals or ears 16, 17, 18 and 19. The terminals or ears 16 and 18 are bendable along the dotted lines to one side of the central portion 15 and at right angles thereto, and the terminals 17—19 are bendable along the dotted lines in the opposite direction and also at right angles to the central portion 15. By this means, the structure shown in Fig. 4 is produced with the terminals 17—19 in horizontal position and the terminals 16—18 in vertical position. The terminals 17—19 thus form ears spaced apart, while the terminals 16—18 likewise form ears spaced apart.

A bolt or like device 20 extends through suitable apertures in the ears 17—19, while a similar bolt 21 extends through apertures in the ears 16—18. Bearing upon the upper and lower faces of the member 10, are plates 22—23, and secured by bolts or other suitable devices 24 to the member 10. The ears 17—19 are pivoted between the plates 22—23 by the bolt 20 which passes through the four members 22, 23 and 17—19.

A portion of the draft tongue is represented conventionally at 25 and is provided with plates 26—27 which are secured to the tongue by bolts or other suitable fastening devices 28. The plates 26—27 are duplicates of the plates 22—23 and bear upon the outer faces of the ears 16—18 and are pivotally secured thereto by the bolt 21 in the same manner as the ears 17—19 are pivotally secured to the bolt 20. By this simple means, the tongue is pivoted to swing laterally upon the bolt 20 relative to the member 10 and likewise pivoted to swing vertically upon the bolt 21.

Attached to the member 10, preferably near its outer ends, are clips, clevises or other suitable devices, 29—30, while similar devices 31—32 are connected to the tongue 25 in advance of its pivot point 21. A chain or other suitable coupling member 33 is connected between the holding devices 29 and 31, while a similar coupling member 34 is connected at its ends to the holding devices 30—32. By this means, the members 33—34 serve as braces to maintain the tongue 25 from lateral movement relative to the member 10, while at the same time leaving it free for movement vertically upon its pivot 21.

When thus arranged, an ordinary vertically swinging tongue is produced but which is rigidly held from lateral movement by the brace members 33—34. If a laterally movable tongue is required, the brace members 33—34 are disconnected, leaving the tongue free to swing both laterally and vertically.

The improved device will be found especially desirable for use in connection with sleds employed for hauling heavy loads. In starting the load, when the sled sticks by being frozen to the ground or otherwise held, it is of great advantage to release the brace members 33—34 so that the tongue may be swung to one side or the other to enable the team to exert a lateral force to break the runners loose from the ground and start them forwardly, and after the load has been thus started, the braces may be restored and thus transform the swinging tongue into a rigid tongue. The device will also be found of great advantage in connection with vehicles upon which the load is to be deposited from the front, such as in some forms of hay loaders, as the horses can be turned to one side by releasing the braces 33—34 and thus disposing them out of the way of the loading apparatus.

The improved device is simple in construction, can be inexpensively manufactured and applied without materially increasing the expense, and may be constructed of any suitable material and of any suitable size.

Having thus described the invention, what is claimed as new is:

1. A draft tongue coupling including a rigid member adapted to be connected to a vehicle, bearing plates secured to the upper and lower faces of the member, a draft tongue, bearing plates secured to the opposite side faces of the draft tongue, a coupling member including spaced pairs of perforated ears arranged at right angles to each other, one pair of ears fitting between the bearing plates on the draft tongue and the other pair of ears fitting between the bearing plates on the rigid member, a horizontal pivot bolt extending through the bearing plates on the draft tongue and the adjacent perforated ears, a vertically disposed pivot bolt extending through the bearing plates on the rigid member and the adjacent pair of perforated ears, the horizontal pivot bolt being disposed in advance of the vertical pivot bolt, and flexible brace members disposed on opposite sides of the vertical pivot bolt and forming a flexible connection between said rigid member and the draft tongue, said brace members being attached to the draft tongue in advance of the horizontal pivot bolt.

2. A draft tongue coupling including a rigid member adapted to be connected to a vehicle, bearing plates secured to the upper and lower faces of the rigid member, holding devices disposed on opposite sides of said bearing plates, a draft tongue, holding devices secured to the draft tongue, bearing plates secured to the side faces of the draft tongue at the rear of the holding devices thereon, a coupling member including spaced pairs of perforated ears, one pair of perforated ears fitting between the bearing plates on the draft tongue and the other pair of said perforated ears fitting between the bearing plates on the rigid member, a horizontal pivot bolt extending through the bearing plates on the draft tongue and the adjacent perforated ears, a vertical pivot bolt independent of the holding devices on the rigid member extending through the bearing plates on said rigid member and through the adjacent perforated ears, and converging brace members forming a flexible connection between the holding members on the rigid member and the holding members on the draft tongue, the horizontal pivot bolt being disposed in advance of the vertical pivot bolt and said vertical pivot bolt being arranged in substantially horizontal alinement with the ends of the holding devices on the rigid member.

In testimony whereof I affix my signature in presence of two witnesses.

CHARLES M. BEACH. [L. S.]

Witnesses:
  DEAN C. TALBOTT,
  MARJORIE N. BROBST.

Copies of this patent may be obtained for five cents each, by addressing the "Commissioner of Patents, Washington, D. C."